US011355907B2

(12) United States Patent
Pedoeem et al.

(10) Patent No.: US 11,355,907 B2
(45) Date of Patent: Jun. 7, 2022

(54) FLIPTOP INTEGRATED LATCH

(71) Applicant: Crestron Electronics, Inc., Rockleigh, NJ (US)

(72) Inventors: Albert Pedoeem, West Orange, NJ (US); Gregory Sorrentino, Hillsdale, NJ (US); David Paolazzi, North Arlington, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 294 days.

(21) Appl. No.: 16/864,923

(22) Filed: May 1, 2020

(65) Prior Publication Data
US 2021/0344181 A1   Nov. 4, 2021

(51) Int. Cl.
*H02G 3/14* (2006.01)
*H02G 3/08* (2006.01)
*B65H 75/34* (2006.01)

(52) U.S. Cl.
CPC .............. *H02G 3/14* (2013.01); *B65H 75/34* (2013.01); *H02G 3/081* (2013.01)

(58) Field of Classification Search
CPC .... H02G 3/14; H02G 3/081; Y10T 292/0894; Y10T 292/0895; Y10T 292/0902; Y10T 292/0969; Y10S 292/11; Y10S 292/38; Y10S 292/63
See application file for complete search history.

(56) References Cited

U.S. PATENT DOCUMENTS

| 3,334,770 | A | * | 8/1967 | Harris | H01H 9/02 292/87 |
| 3,724,889 | A | * | 4/1973 | Dooley | E05C 1/10 292/87 |
| 4,979,634 | A | * | 12/1990 | Begley | H01H 9/287 174/67 |
| 6,046,405 | A | | 4/2000 | Obermann et al. | |
| 6,162,071 | A | | 12/2000 | Muller | |
| D465,201 | S | | 11/2002 | Gershfeld | |
| 6,802,577 | B2 | | 10/2004 | Gershfeld | |

(Continued)

OTHER PUBLICATIONS

AMX, HydraPort: Connecting the Perfect Meeting, Product Guide, Rev. V3 (Sep. 8, 2014), available at pdf.archiexpo.com/pdf/amx/hydraport/51274-177337.html.

(Continued)

*Primary Examiner* — Stephen J Castellano
(74) *Attorney, Agent, or Firm* — Crestron Electronics, Inc.

(57) ABSTRACT

An integrated latching mechanism includes a slider button extending along a first direction, curved elastic arms that extend from the slider button in a second direction and then curve back in an direction opposite thereto, a locking part contiguous with the slider button and extending away from the slider button and the elastic arms in a third direction perpendicular to the first direction. In response to ends of the elastic arms being held at fixed positions and an external force urging the slider button in a direction opposite to the third direction, the locking part moves in the same direction, and the urging of the slider button distorts the elastic arms such that upon removal of the external force, the elastic arms move the slider button and the locking part in the third direction. The elastic arms, slider button, and locking part form a single piece of elastic material.

14 Claims, 9 Drawing Sheets

(56) References Cited

U.S. PATENT DOCUMENTS

| | | | |
|---|---|---|---|
| D513,493 S | 1/2006 | Feldstein et al. | |
| 7,312,393 B2 | 12/2007 | McCarthy et al. | |
| D569,863 S | 5/2008 | Feldstein et al. | |
| 7,667,145 B2 | 2/2010 | Dinh et al. | |
| D626,542 S | 11/2010 | Libman et al. | |
| D628,097 S | 11/2010 | Libman et al. | |
| D628,098 S | 11/2010 | Libman et al. | |
| D628,099 S | 11/2010 | Libman et al. | |
| D638,314 S | 5/2011 | Libman et al. | |
| D638,315 S | 5/2011 | Libman et al. | |
| D639,680 S | 6/2011 | Libman et al. | |
| D639,681 S | 6/2011 | Rodriguez et al. | |
| D640,577 S | 6/2011 | Libman et al. | |
| D640,939 S | 7/2011 | Libman et al. | |
| D640,940 S | 7/2011 | Libman et al. | |
| 7,989,710 B2 | 8/2011 | Hansen et al. | |
| D657,315 S | 4/2012 | Feldstein et al. | |
| D664,050 S | 7/2012 | Rodriguez et al. | |
| D678,786 S | 3/2013 | Rodriguez et al. | |
| 8,469,303 B2 | 6/2013 | Feldstein et al. | |
| 8,469,304 B2 | 6/2013 | Feldstein et al. | |
| 8,469,305 B2 | 6/2013 | Feldstein et al. | |
| D686,992 S | 7/2013 | Eisen | |
| 8,896,656 B2 | 11/2014 | Epstein et al. | |
| 8,943,978 B2 | 2/2015 | Soper et al. | |
| 9,056,744 B2 | 6/2015 | Feldstein et al. | |
| D734,729 S | 7/2015 | Chaloupecky et al. | |
| 9,257,776 B2 | 2/2016 | Kramer | |
| 9,475,673 B2 | 10/2016 | Feldstein et al. | |
| D775,080 S | 12/2016 | Newhouse | |
| 9,706,833 B2 | 7/2017 | Newhouse et al. | |
| D801,285 S | 10/2017 | Timmins et al. | |
| 2003/0070592 A1 | 4/2003 | Grasse et al. | |
| 2005/0183479 A1* | 8/2005 | Alacqua | E05B 47/0009 70/277 |
| 2012/0175452 A1 | 7/2012 | Feldstein et al. | |
| 2013/0068870 A1 | 3/2013 | Feldstein et al. | |
| 2014/0265753 A1 | 9/2014 | Soper et al. | |
| 2014/0346268 A1 | 11/2014 | Feldstein et al. | |
| 2015/0166299 A1 | 6/2015 | Feldstein et al. | |
| 2019/0161314 A1 | 5/2019 | Replogle et al. | |
| 2019/0166707 A1 | 5/2019 | Pedoeem et al. | |

OTHER PUBLICATIONS

Arthur Holm, Albiral Display Solutions SL, Catalog, EN2016-2017, available at www.arthurholm.com/wp-content/uploads/2017/03/AH_Catalogue_2017.pdf.
Bachmann Electrical Engenering Ltd., Facility Solutions, System solutions for Office, conference and meeting rooms, Jun. 2016, availble at genproel-el.gr/data/documents/2017.pdf.
Crestron, Crestron FlipTops, D4520-C_201410, 2014, available at www.crestron.com/downloads/pdf/product_brochures/crestron_fliptops_brochure.pdf.
Extron, Cable Cubby 202, 2014, available at www.extron.com/download/files/brochure/CC_202_Printable_A4.pdf.
Extron, Cable Cubby 500, 2014, available at www.extron.com/download/files/brochure/CC_500_Printable_A4.pdf.
Extron, Cable Cubby 700, 2014, available at www.extron.com/download/files/brochure/CC_700_Printable_A4.pdf.
Extron, Cable Cubby 1200, 2014, available at www.extron.com/download/files/brochure/CC_1200_Printable_letter_size.pdf.
Extron, Cable Cubby 1400, 2014, available at www.extron.com/download/files/brochure/CC_1400_Printable_letter_size.pdf.
Extron, Cable Cubby Series 2, Mar. 2016, 68-2604-01, Rev. C, available at www.extron.com/download/files/brochure/cable_cubby_series_2_verA4.pdf.
Extron Catalog, AAP—Architectural Adapter Plates, 2012 Product Catalog, available at www.extron.com/download/files/general/aaps_12cat_en.pdf.
FSR Inc., T6 FLEX, LIT1434A, 2015, available at fsrinc.com/documents/spec-sheet/9187-lit1434c-t6-flex-spec-sheet-pdf/file.
FSR Inc., Table Boxes, LIT1187H, 2014, available at www.novotech.com.mx/wp-content/uploads/2016/03/1187H-Table-Box-Brochure.pdf.
Herman Miller, Inc., Logic Power Access Solutions, 2015, available at www.hermanmiller.com/content/dam/hermanmiller/documents/product_literature/product_sheets/Logic_Power_Access_Solutions_product_sheet.pdf.
Extron Electronics, "Hideaway" Family Brochure, 2002.
Extron Electronics, Extron® Hideaway Series Brochure, 2002.
Kramer Electronics Ltd., K-Able/XL Box Cable Retractor, User Manual, P/N: 2900-300441 Rev 3, 2015, available at k.kramerav.com/downloads/manuals/k-able_xl_box.pdf.
Kindermann, MultiMedia connection sytems, 2014, available at www.kindermann.de/fileadmin/medien/printmedien/MultiMedia_connection_systems/GB/MultiMedia_connection_systems_GB.pdf.
Legrand, WIREMOLD® AVIP Series Device Plates, ED1670R3—Updated Jan. 2015, available at www.legrand.us/wiremold.aspx.
Legrand, WIREMOLD®, DEQUORUM™ Flip-Up Table Boxes, ED1755 0715,2015, available at www.middleatlantic.com.
Legrand, WIREMOLD® Table Boxes, Table Boxes bring technology to the point-of-use, ED1706R5—Updated Mar. 2016 , available at www.legrand.us/wiremold.aspx.
Legrand, wiremold®, InteGreat™ A/V Table Box, ED1699R1 0913, 2013, available at www.legrand.us/wiremold.aspx.
Legrand, wiremold®, Meeting Room Solutions, ED1710, 2013, available at www.legrand.us/wiremold.aspx.
Legrand, wiremold® Table Boxes, ED1652R3—Updated Apr. 2016, available at www.legrand.us/wiremold.aspx.
Soltec, LCD-TFT Solutions, 2015, available at dvs.rs/wp-content/uploads/2017/07/ENGLISH-SOLTEC-CATALOGUE.pdf.

* cited by examiner

FLIPTOP INTEGRATED LATCH

BACKGROUND OF THE INVENTION

Technical Field

The present embodiments relate to insertable fliptop units that provide access to a variety of cables, connectors, and power outlets and, more particularly, to fliptop units that can be inserted into an opening in a table or lectern an having a lid that can be opened to provide such access to a variety of cable, connector, and power outlet modules.

Background Art

In many applications, it is desirable to provide power and data connections to different electrical or electronic devices using cables which may be dispensed when needed and then withdrawn when no longer needed. For example, many business and academic environments include conference rooms in which meetings are held where the participants bring laptop or notebook computers, video projectors or other devices that require various data connections. It is desirable that the conference room or similar facility be configured to deliver these services by providing cables which are connectable to the various devices. It further desired that such cables can be stowed away out of sight when they are no longer needed after the meeting.

Various apparatuses such cable connections. As an example, fliptop enclosures may be provided that are inserted in an cutout in a conference table, lectern, or other work surface. The fliptop unit typically includes a housing that extends below surface of the tabletop or work surface and a bezel and lid that are disposed on or above the surface. By operating the lid, access is provided to a variety of cables, connectors, and power outlets disposed within the enclosure. One or more cables and/or connectors may then be withdrawn from the enclosure for use during a meeting or presentation. Typically, a device, such as a cable retractor, is attached to the housing and stores the cable in a manner that permits the cable to be pulled out from the enclosure, and prevents the withdrawn cable from being pulled back into the enclosure until such time as the cable or connector is no longer needed. The lid of the fliptop unit may then be closed to cover the opening in the enclosure.

It is desirable that the lid of the fliptop unit remain closed when not needed and not open accidentally. Therefore, a positive lock mechanism is desired that prevents accidental movement of the lid. At the same time, it is also desirable that such positive lock mechanisms be as small as possible so that the lid and bezel have a low profile with respect to the work surface.

Additionally, it is often desirable to permit the lid of the flip top to close while the cable is in use. Therefore, a configuration of the lid and a lock mechanism is needed that will allow the lid to close while one or more cable are extended from from the enclosure and to remain closed.

It is therefore desirable to provide a fliptop unit with an improved lock mechanism the reduces the likelihood of the accidental movement of the lid of the unit.

It is further desirable to provide a fliptop unit that permits extended cables to exit from the unit while the lid of the unit remains closed.

SUMMARY OF THE INVENTION

It is to be understood that both the general and detailed descriptions that follow are exemplary and explanatory only and are not restrictive.

DISCLOSURE OF INVENTION

In accordance with an aspect, an integrated latching mechanism comprises: a slider button extending along a first direction; first and second curved elastic arms that extend from the slider button in a second direction and then curve back in a direction opposite to the second direction; a locking part contiguous with the slider button and extending away from the slider button and the first and second curved elastic arms in a third direction perpendicular to the first direction; wherein in response to an end of each of the first and second curved elastic arms being held at fixed positions and an external force urging the slider button in a direction opposite to the third direction, the locking part moves in the direction opposite to the third direction, and the urging of the slider button distorts the first and second curved elastic arms such that upon removal of the external force, the first and second curved elastic arms move the slider button and the locking part in the third direction, and the first and second curved elastic arms, the slider button, and the locking part form a single piece of elastic material.

According to a further aspect, a fliptop unit comprises: a movable lid; a bezel configured to surround the movable lid; an insert configured to be coupled with the bezel; and an integrated latching mechanism that is disposed between the bezel and the insert and having a slider button that extends through an aperture formed in the bezel, and a locking part formed adjacent to the slider button and extending away from the slider button, wherein the integrated latching mechanism is configured such that an external force urging the slider button to move within the aperture moves the locking part in a same direction and releases the movable lid, and the urging of the slider button distorts the integrated latching mechanism such that upon removal of the external force, the integrated latching mechanism urges the slider button and the locking part in an opposite direction.

According to another aspect, a fliptop unit comprises: a movable lid; a bezel configured to surround the movable lid; an insert configured to be coupled with the bezel; and an integrated latching mechanism that is disposed between the bezel and the insert, and comprising: a slider button extending along a first direction through an aperture formed in the bezel, first and second curved elastic arms that are each substantially U-shaped and which extend from the slider button in a second direction and then curve back in a direction opposite to the second direction, and at a base of the U-shape, each of the first and second curved elastic arms includes a portion configured to press against wall portions formed in a region of the bezel and hold the integrated latching mechanism in place, the ends of the first and second curved elastic arms each including a pad having a post that extends away from the pad and to couple with corresponding openings formed in the insert, a locking part contiguous with the slider button and extending away from the slider button and the first and second curved elastic arms in a third direction perpendicular to the first direction, the locking part including a flat surface that is parallel to the third direction, and an opposing surface that slants toward and intersects with the flat surface at one end, wherein in response to an external force urging the slider button in a direction opposite to the third direction, the locking part moves in the direction opposite to the third direction and releases the movable lid, and the urging of the slider button distorts the first and second curved elastic arms such that upon removal of the external force, the first and second curved elastic arms move the slider button and the locking part in the third direction, and the first and second curved elastic arms, the slider button, and the locking part form a single piece of elastic material.

BRIEF DESCRIPTION OF DRAWINGS

The accompanying figures further illustrate the present embodiments.

The components in the drawings are not necessarily drawn to scale, emphasis instead being placed upon clearly illustrating the principles of the present embodiments. In the drawings, like reference numerals designate corresponding parts throughout the several views.

Figure 1:
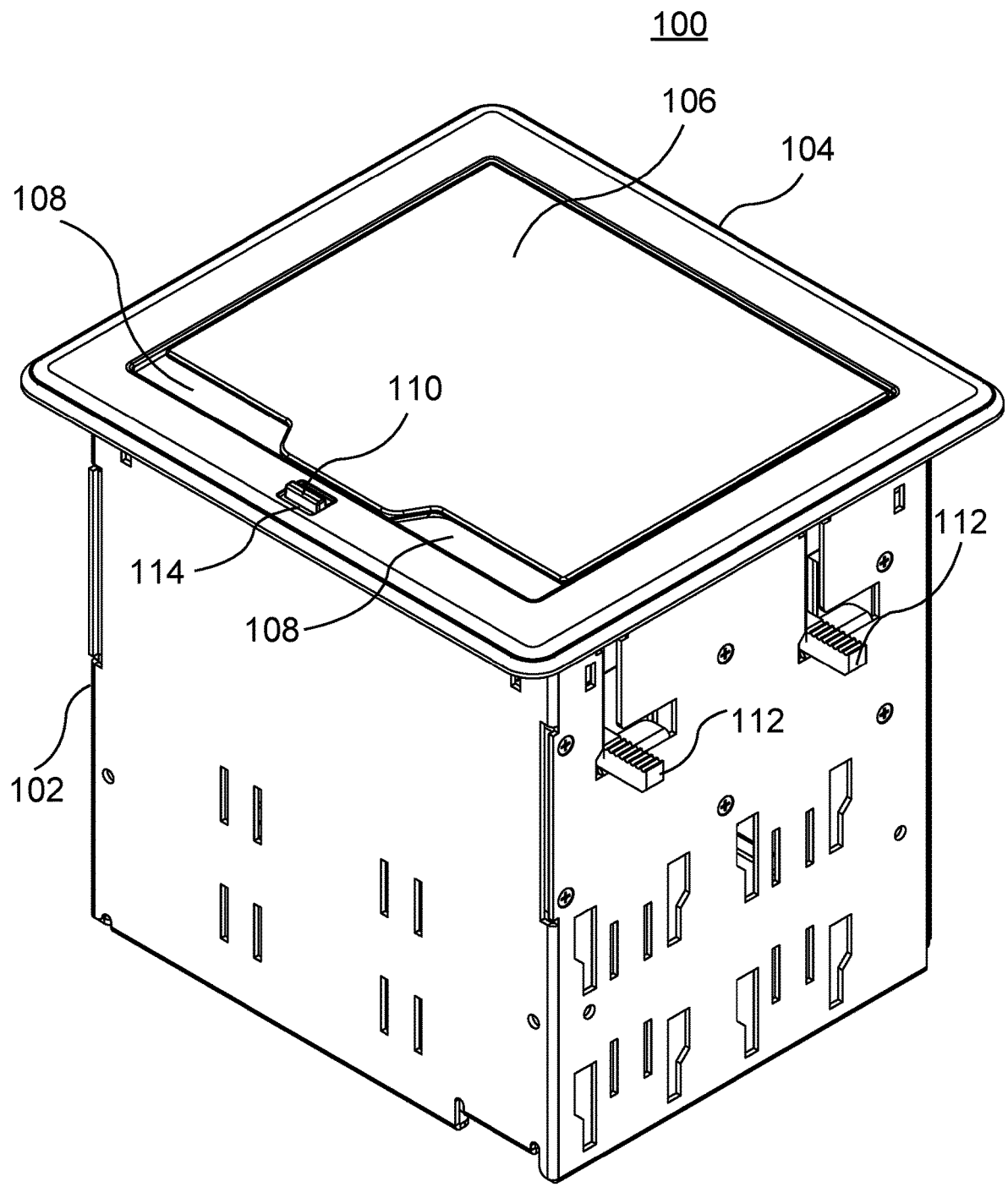

Brief Description of the Several Views of the Drawing

FIG. 1 is an isometric view of a flip-top unit and showing the lid of the unit closed and held in place by a latch mechanism in accordance with an embodiment.

Figure 2:
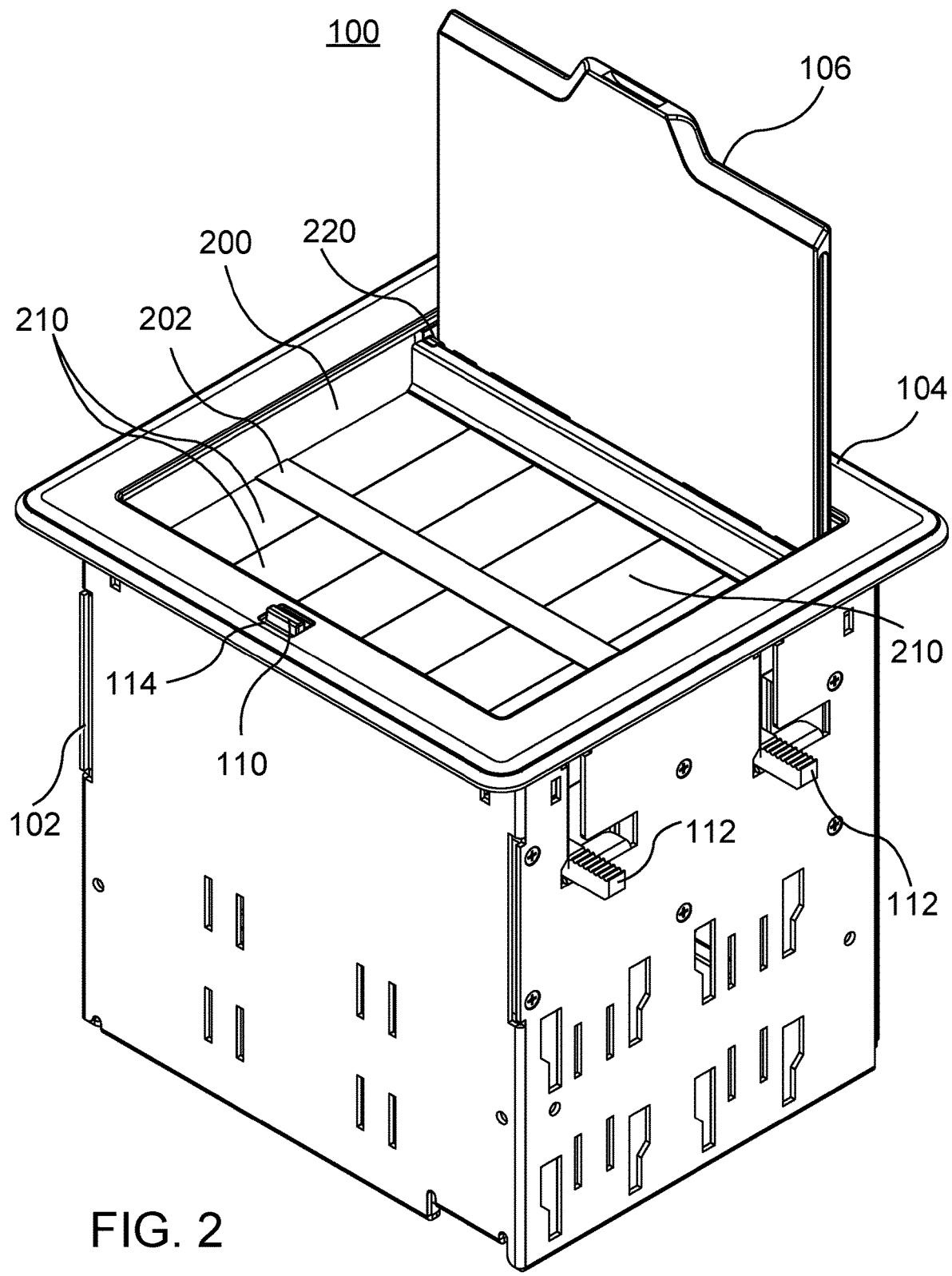

FIG. 2 is an isometric view of the flip-top unit of FIG. 1 and showing the lid of the unit moving upward after release of the latch mechanism in accordance with an embodiment.

Figure 3:
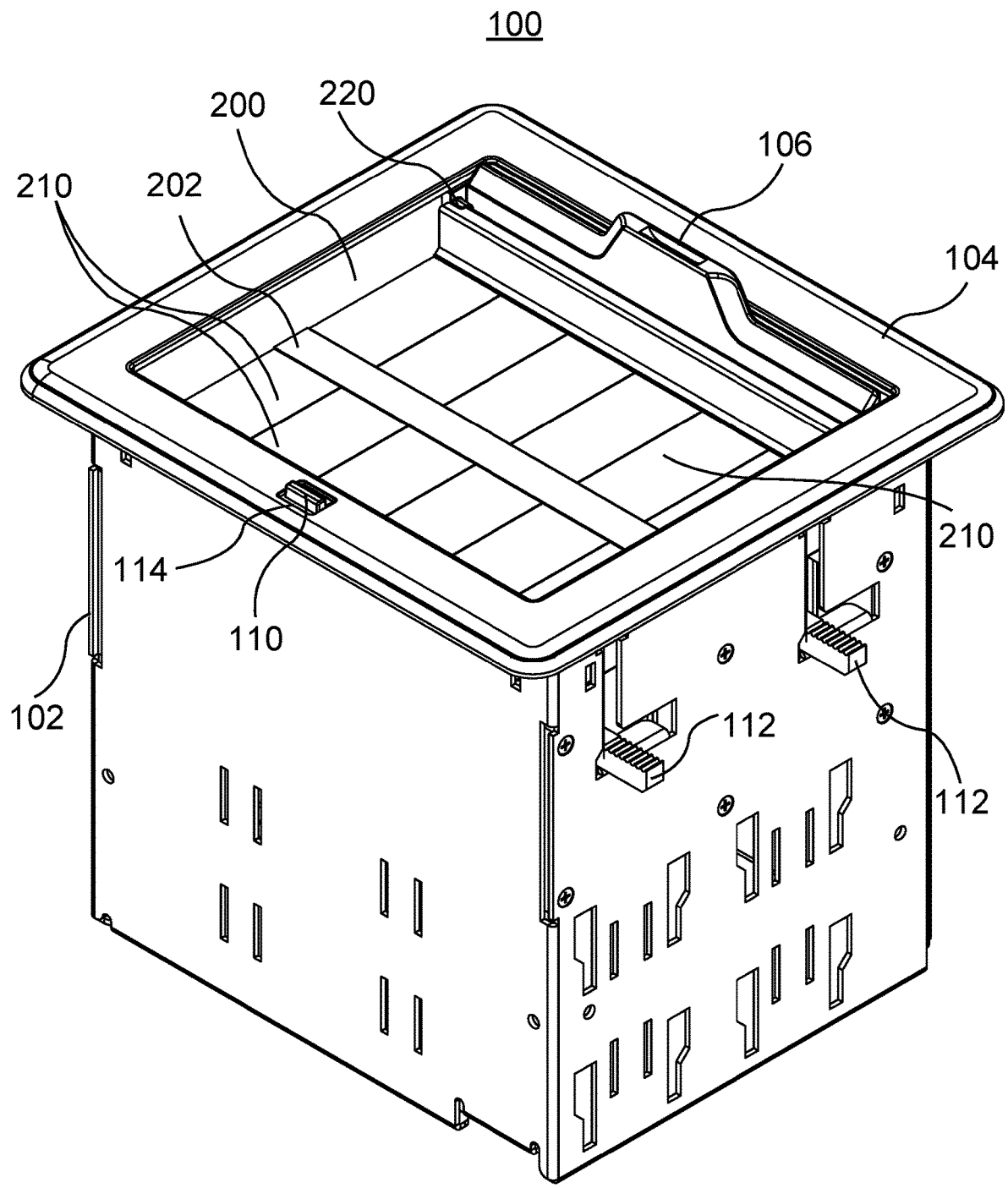

FIG. 3 is an isometric view of the flip-top unit of FIG. 2 and showing the lid of the unit recessed within the enclosure in accordance with an embodiment.

Figure 4:
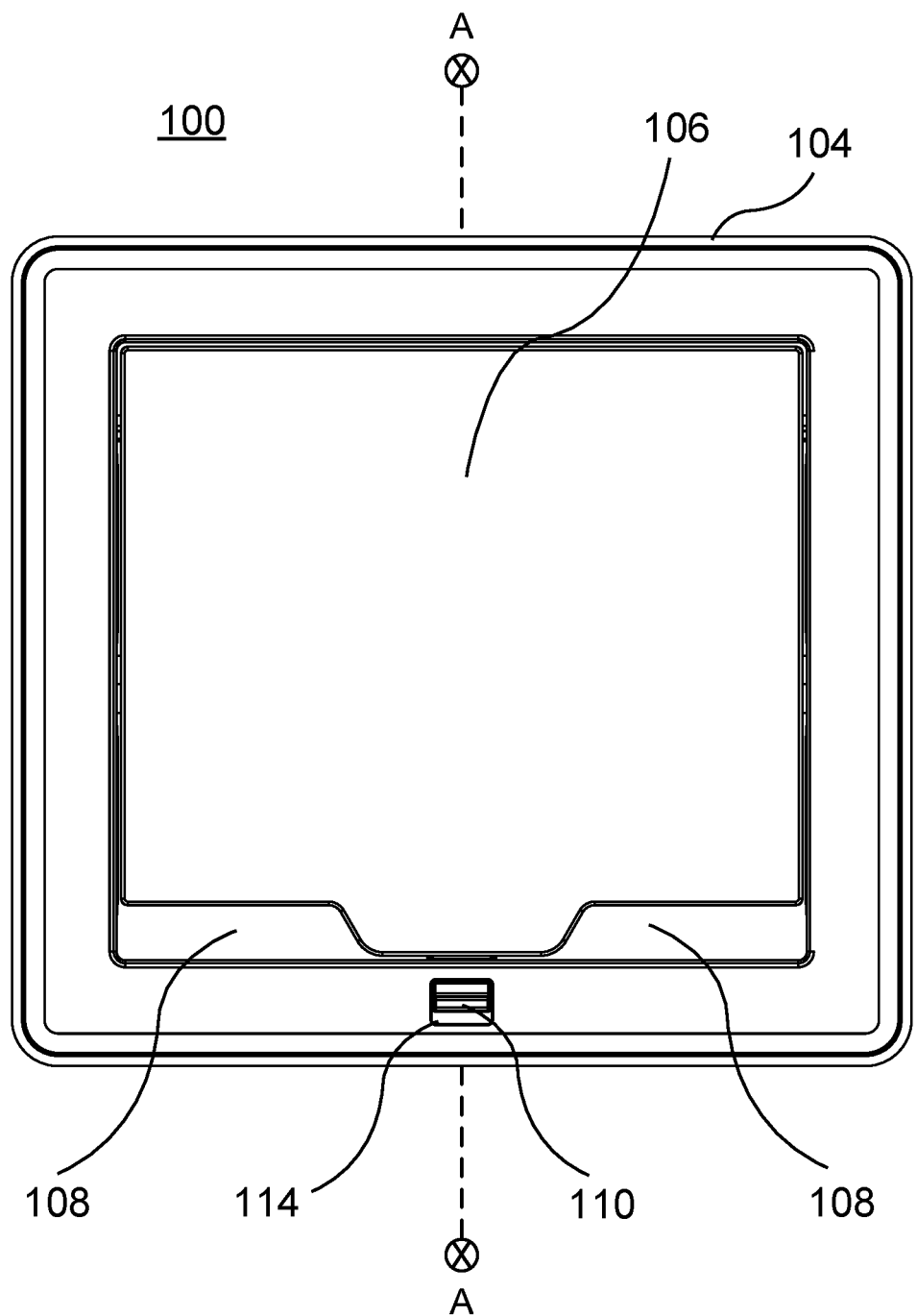

FIG. 4 is a top view of the bezel and lid of the flip-top unit of FIG. 1 having the lid of the unit closed and held in place by the latch mechanism in accordance with an embodiment.

Figure 5:
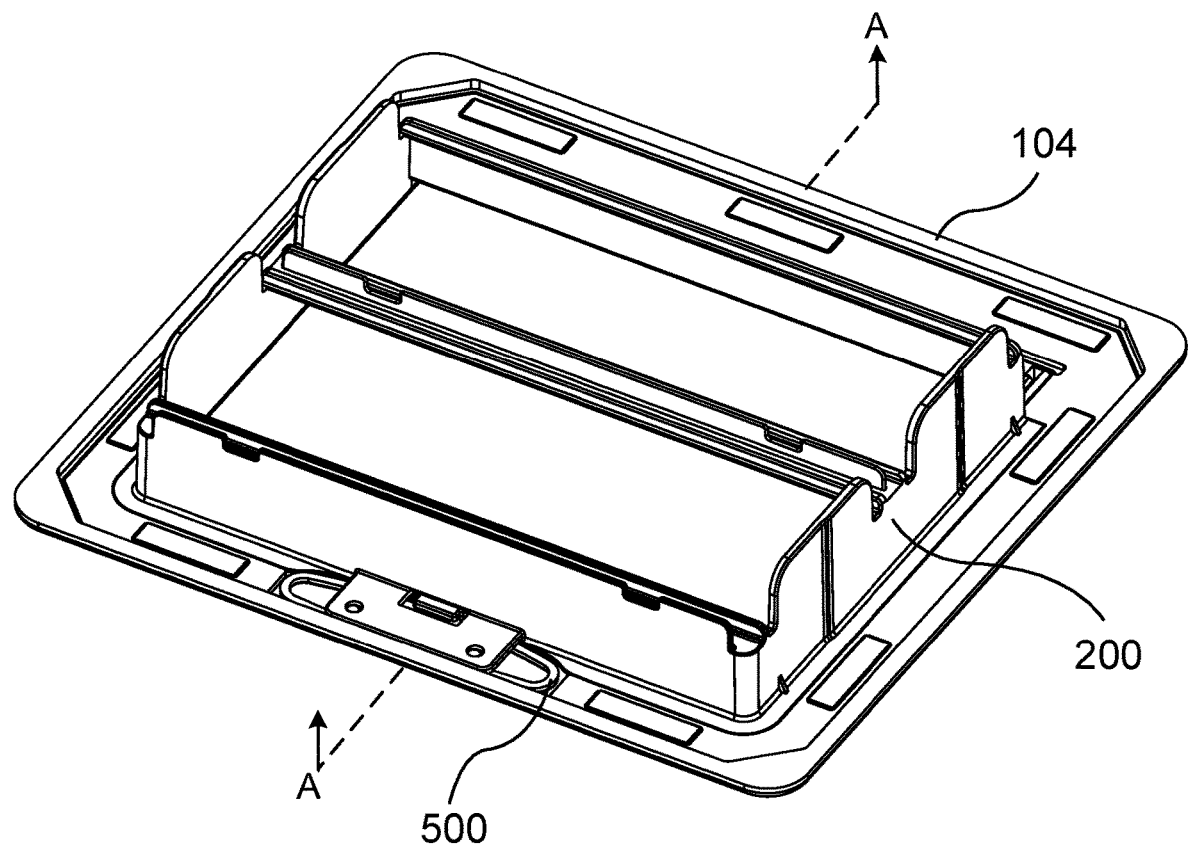

FIG. 5 is a bottom isometric view showing, in combination, the bezel, latch mechanism, and cover insert of the flip-top unit in accordance with an embodiment.

Figure 6:
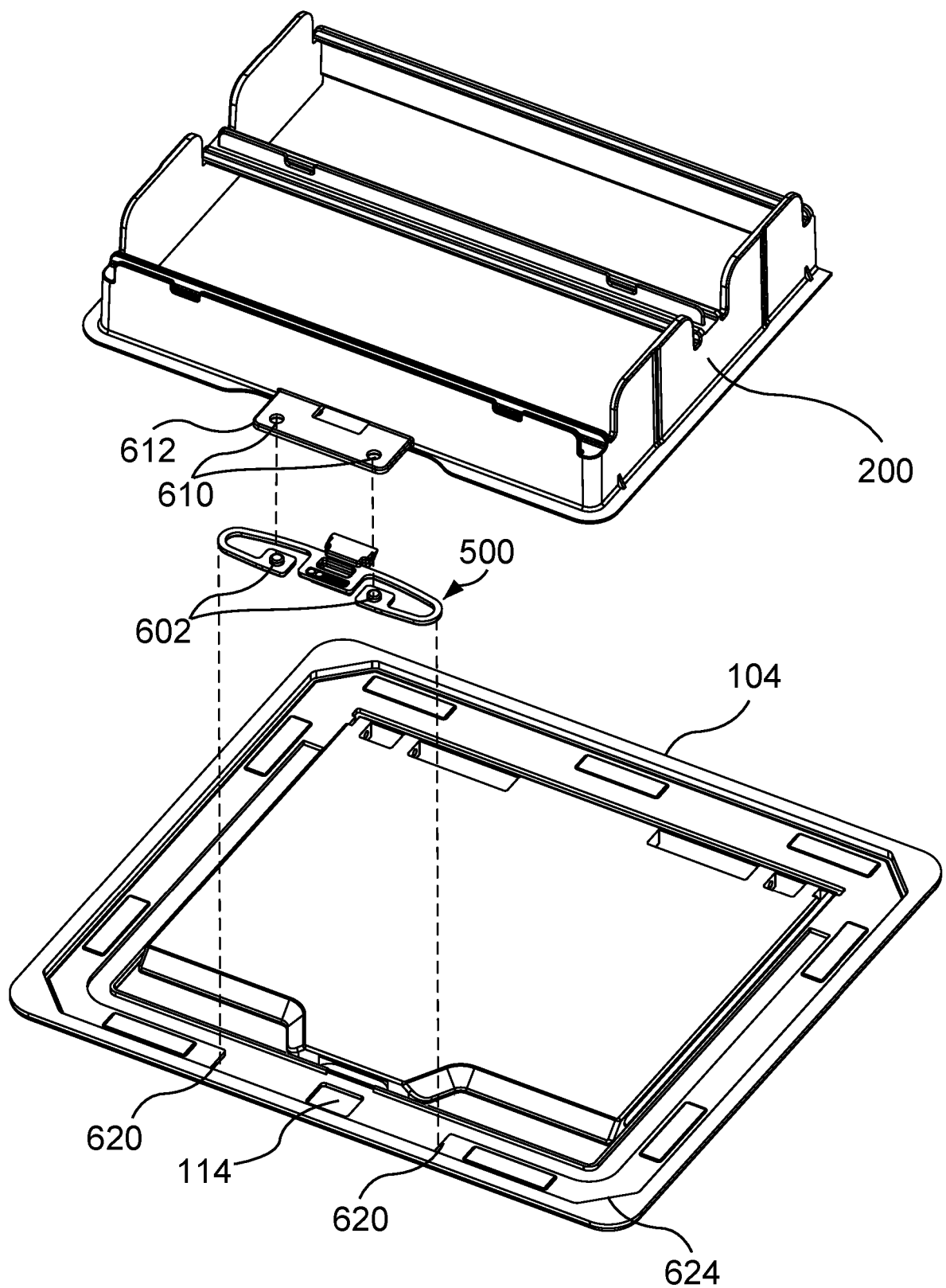

FIG. 6 is an exploded view showing, separately, the bezel, the latch mechanism, and the cover insert of the flip-top unit of FIG. 5 in accordance with an embodiment.

Figure 7A:
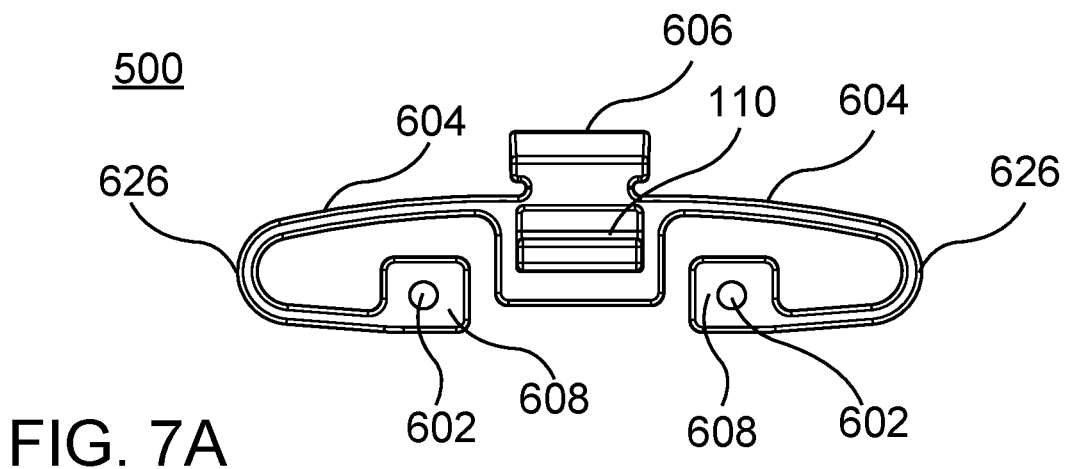
Figure 7B:
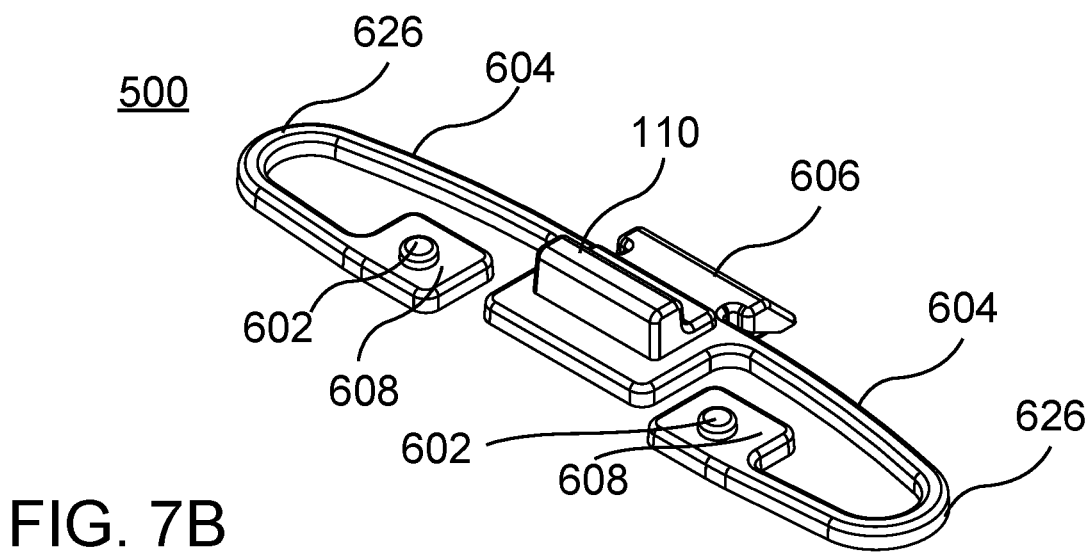
Figure 7C:
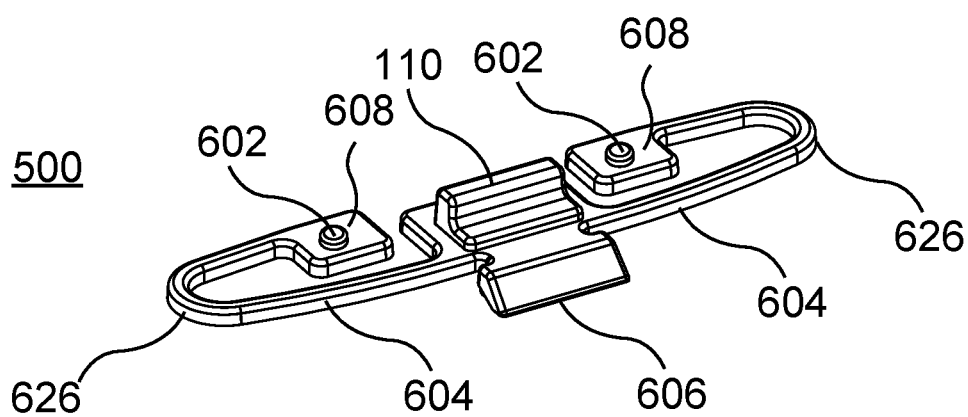

FIG. 7A is a top view of the latch mechanism in accordance with an embodiment, FIG. 7B is a top isometric view of the button and locking mechanism of FIG. 7A, and FIG. 7C is another top isometric view of the button and locking mechanism of FIG. 7A.

Figure 8A:
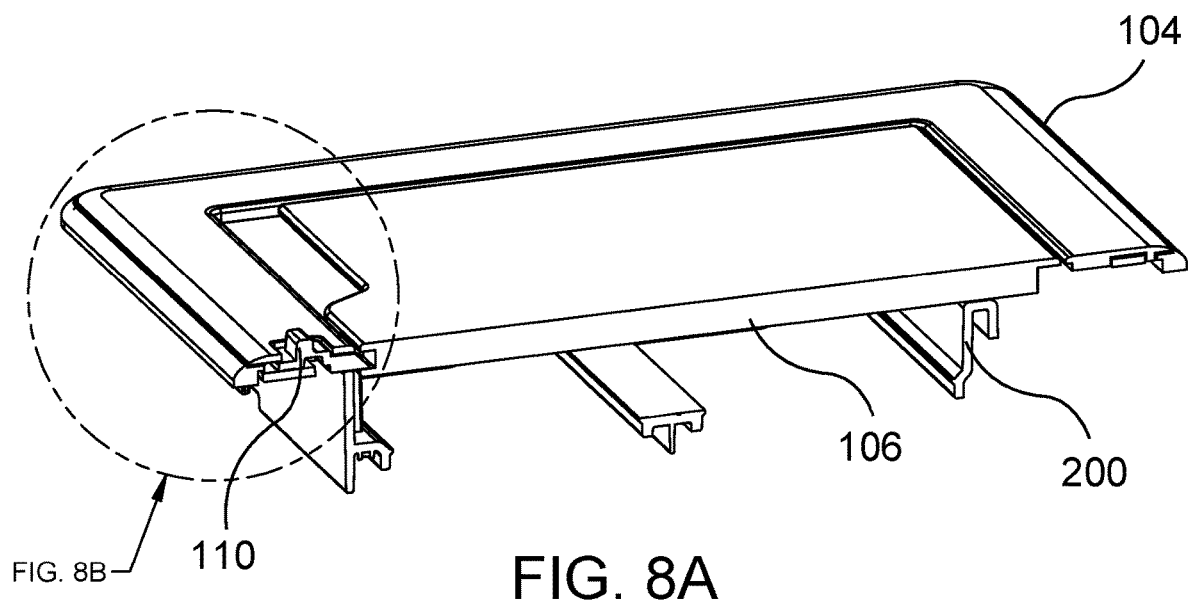
Figure 8B:
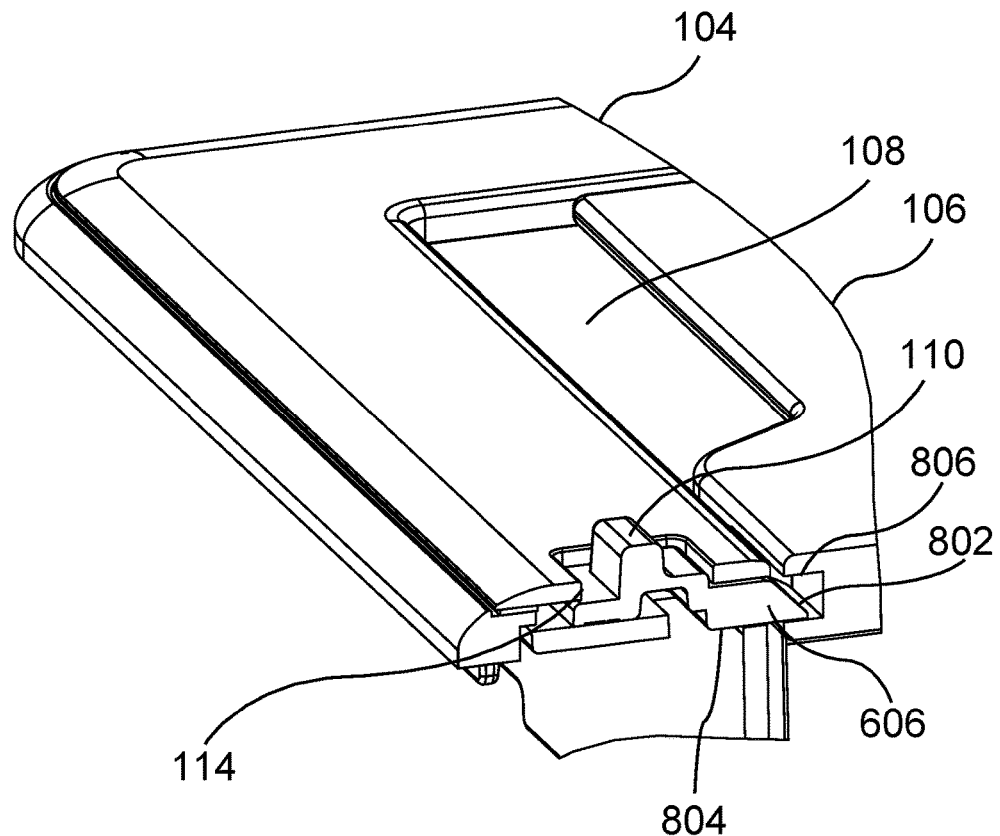

FIG. 8A is a cross-sectional view taken along line A-A of FIGS. 4 and 5, and FIG. 8B is an enlarged view of the circled portion of FIG. 8A.

Figure 9:
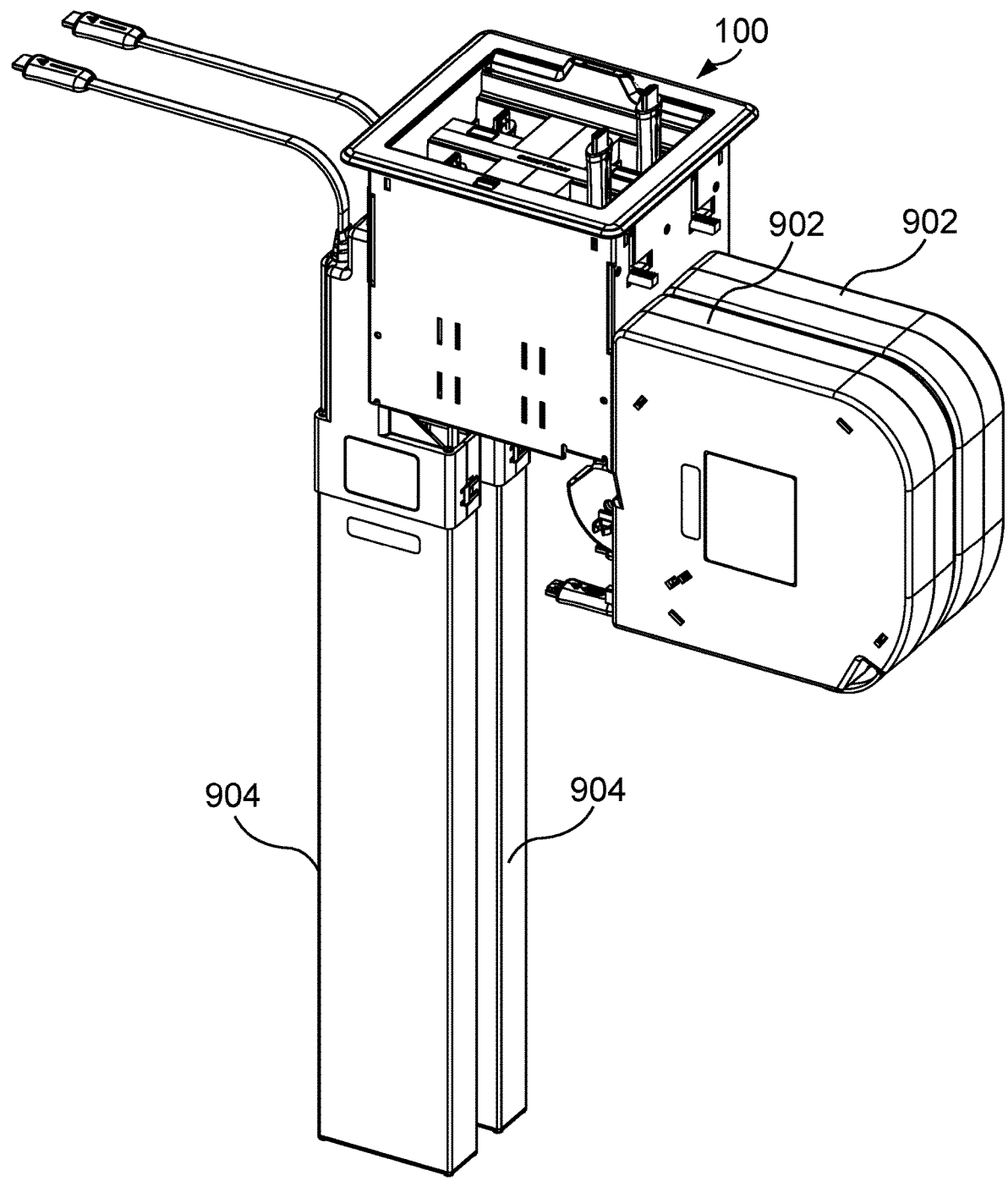

FIG. 9 is an isometric view of a flip-top unit having various cable retractors attached thereto in accordance with an embodiment.

DETAILED DESCRIPTION OF THE INVENTION

The present embodiments provide a fliptop unit that provides an improved positive locking mechanism using an integrated latch, button and spring mechanism.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

LIST OF REFERENCE NUMBERS FOR THE MAJOR ELEMENTS IN THE DRAWING

The following is a list of the major elements in the drawings in numerical order.

100 fliptop unit
102 housing
104 bezel
106 lid
108 gaps
110 slider button
112 dog ears
114 aperture
200 cover insert
202 crossbar
210 modules
220 hinge
222 opening in bezel
500 integrated latch, button and spring mechanism
602 pins
604 elastic arms
606 locking part
608 pads
610 openings in lip
612 lip
620 wall portions
624 inner wall
626 curved ends
802 slanted surface (of locking part)
804 flat surface (of locking part)
806 edge (of lid)
902 cable retractor
904 cable retractor

MODE(S) FOR CARRYING OUT THE INVENTION

The embodiment described herein in the context of a fliptop unit, but is not limited thereto, except as may be set forth expressly in the appended claims.

Referring first to FIG. 1, a fliptop unit 100 is shown according to an embodiment. The fliptop unit includes a housing 102 which is configured to be inserted into a cutout opening in a conference table, lectern, or other tabletop work surface and to be disposed below the work surface. The housing 102 may include one or more self-deploying dog-ears 112 which deploy outwardly underneath the tabletop work surface to secure the flip-top unit to the tabletop.

A bezel 104 is attached to the housing 102 and is configured to rest flush atop the tabletop. A movable door or lid 106 is shown in its closed position and held in place, according to an embodiment, by an integrated latch, button and spring mechanism that is disposed below the bezel 102 and from which a slider button portion 110 extends through an aperture 114 in the bezel. When in the closed position, the lid 106 covers an opening 120 in the bezel but may permit one or more gaps 108 through which cables drawn from within the housing 102 may extend for use while the lid is closed.

FIG. 2 shows the fliptop unit 100 after the slider button 110 is moved in a manner that releases the lid 106 and permits the lid 106 to swing open and pivot upward about, for example, a hinge 220. As FIG. 3 shows, the fliptop unit 100 may be further configured to cause the lid 106 to then slide downward into the back end of the housing to conceal most of the lid. An example of a fliptop housing and lid in which the lid pivots and then slides downward when released is described in U.S. Patent Application Publication No. US 2019/0161314 A1, filed Nov. 30, 2017 and published May 30, 2019, titled "Gravity Driven Cable Retractor" and assigned to Crestron Electronics, Inc., the disclosure of which is incorporated herein by reference.

FIGS. 2 and 3 also show that the flip top unit includes multiple locations 210 for insertions of modules, such as power module inserts, 1G, 2G or 3G connector or receptacle module inserts, HDMI connector module inserts, and/or pass through module inserts. After insertion of the desired modules, a cover insert 200 is disposed atop the modules and includes a crossbar 202 for holding the modules in place. The bezel 104 is then secured to the housing. An example of a configuration of a fliptop housing for receiving such inserts is similarly disclosed in US 2019/0161314 A1, the disclosure of which is incorporated herein by reference.

FIG. 4 shows a top view of the bezel 104, and lid 106 in the closed position. Also shown are the gaps 108 between the lid and the bezel as well as the slider button 110 located in the aperture 114 in the bezel.

FIG. 5 shows a bottom perspective view of the cover insert 200 coupled to the underside of the bezel 104 and which, in combination, hold in place an integrated latch, button and spring mechanism 500, according to an embodiment.

FIG. 6 shows an exploded view of the bezel 104, the cover insert 200, and the integrated latch, button and spring mechanism 500 shown in combination in FIG. 5. The mechanism 500 includes flexible elastic arms 606, the slider button 110, and a locking part 606. One or more pins 602 are provided and may be located at pads 608 that are disposed at the ends of the mechanism 500. The pins 602 are configured to mate with the openings 610 formed in a lip 612 of the cover insert 200. The mechanism 500 further includes curved end parts 626 which are configured to abut the wall portions 620 formed in the bezel 104 which secure the mechanism to the bezel. In this manner, the mechanism 500 is held in place by both the bezel 104 and the cover insert 200 when assembled together.

FIG. 7A shows a top view of the integrated latch, button and spring mechanism 500 shown in FIG. 6, and FIGS. 7B and 7C show various top isometric views of the mechanism 500.

FIG. 8A shows a cross-sectional view of the bezel 104, the lid 106, the cover insert 200, and the integrated latch, button and spring mechanism 500 taken along line A-A in FIG. 5. FIG. 8B shows a portion of the cross-sectional view in greater detail. Though the mechanism 500 is held in place between the bezel 104 and the lid 106, the slider button 110 of the mechanism is free to be moved manually within the aperture 114 in the bezel. The elasticity in the mechanism ordinarily urges the locking part 606 in a direction toward the opening 120 in the bezel so that the lid, when closed, is held in place by the locking part 606.

The locking part 606 further includes a slanted surface 802 that permits the lid to be secured when moved from the open position to the closed position. The movement of the lid pushes on the slanted surface 802 to drive the locking part 606 away from the opening 120 in the bezel until the edge 806 of the lid 104 moves below the locking part 606. The elasticity in the mechanism 500 then urges the flat surface 804 of the locking part 606 back over the edge 806 of the lid so that the locking part then holds the lid in the closed position.

To release the lid 606 from the closed position, the slider button 110 is slid within the aperture 114 away from the opening 120 in the bezel. The elasticity in the mechanism 500 permits sufficient movement to the slider button 110 such that the locking part 606 moves away from the edge 806 of the lid and permits the lid to swing open in the manner previously described in connection with FIGS. 2 and 3.

FIG. 9 shows an example a fliptop unit 100 according to an embodiment in which various cable retractors 902, 904 are coupled to the fliptop unit. Examples of cable retractors that may be coupled to the fliptop unit include the gravity driven cable retractors disclosed in US 2019/0161314 A1 and in its continuation-in-part, U.S. Application Publication No. US 2019/0166607 A1, filed Oct. 14, 2018 and published May 30, 2019, titled "Dampened Gravity Retractor" and assigned to Crestron Electronics, Inc.; the "One Touch" retractor disclosed in U.S. Pat. No. 10,549,946, issued Feb. 2, 2020, titled "Cable Retractor" and assigned to Crestron Electronics, Inc.; and U.S. Pat. No. 8,469,303, issued Jun. 25, 2013, U.S. Pat. No. 8,469,305, issued Jun. 25, 2013, and U.S. Pat. No. 9,475,673, issued Oct. 25, 2016, each titled "Cable Cord Retractor" and assigned to Crestron Electronics, Inc.; the disclosures of which are incorporated herein by reference.

INDUSTRIAL APPLICABILITY

To solve the aforementioned problems, the present embodiments provide a fliptop unit that provides an improved positive locking mechanism using an integrated latch, button and spring mechanism.

Alternate Embodiments

Alternate embodiments may be devised without departing from the spirit or the scope of the embodiments.

What is claimed is:

1. A fliptop unit, comprising:
a movable lid;
a bezel configured to surround the movable lid;
an insert configured to be coupled with the bezel; and
an integrated latching mechanism that is disposed between the bezel and the insert and having a slider button that extends through an aperture formed in the bezel, and a locking part formed adjacent to the slider button and extending away from the slider button,
wherein the integrated latching mechanism is configured such that an external force urging the slider button to move within the aperture moves the locking part in a same direction and releases the movable lid, and
the urging of the slider button distorts the integrated latching mechanism such that upon removal of the external force, the integrated latching mechanism urges the slider button and the locking part in an opposite direction.

2. The fliptop unit of claim 1, wherein the locking part includes a flat surface that is configured to abut against an edge of the movable lid to secure the movable lid to the bezel, and the urging of the slider button moves the flat surface away from contact with the edge of the lid.

3. The fliptop unit of claim 2, wherein the locking part includes an opposing slanted surface that intersects the flat surface at one end, such that when the edge of the lid is in an unsecured position and moved toward the bezel, the edge of the lid pushes against the slanted surface to distort the integrated latching mechanism, and upon the edge of the movable lid moving past the slanted surface, the elastic force generated by the distortion of the integrated latching mechanism causes the flat surface to abut against the edge of the movable lid and secure the movable lid to the bezel.

4. The fliptop unit of claim 1, wherein the integrated latching mechanism includes:

the slider button which extends along a first direction, first and second curved elastic arms that extend from the slider button in a second direction and then curve back in a direction opposite to the second direction, the locking part which is contiguous with the slider button and extends away from the slider button and the first and second curved elastic arms in a third direction perpendicular to the first direction, an end of each of the first and second curved elastic arms are held at fixed positions with respect to the bezel and insert, in response to an external force urging the slider button in a direction opposite to the third direction, the locking part moves in the direction opposite to the third direction, and the urging of the slider button distorts the first and second curved elastic arms such that upon removal of the external force, the first and second curved elastic arms move the slider button and the locking part in the third direction, and the first and second curved elastic arms, the slider button, and the locking part form a single piece of elastic material.

5. The fliptop unit of claim 4, wherein the first and second curved elastic arms are each substantially U-shaped.

6. The fliptop unit of claim 5, wherein at a base of the U-shape, each of the first and second curved elastic arms includes a portion configured to press against wall portions formed in a region of the bezel and hold the integrated latching mechanism in place.

7. The fliptop unit of claim 4, wherein the ends of the first and second curved elastic arms each include a pad having a post that extends away from the pad and to couple with corresponding openings formed in the insert.

8. The fliptop unit of claim 4, wherein the locking part includes a flat surface that is parallel to the third direction, and an opposing surface that slants toward and intersects with the flat surface at one end.

9. An integrated latching mechanism, comprising:
a slider button extending along a first direction;
first and second curved elastic arms that extend from the slider button in a second direction and then curve back in a direction opposite to the second direction;
a locking part contiguous with the slider button and extending away from the slider button and the first and second curved elastic arms in a third direction perpendicular to the first direction;
wherein in response to an end of each of the first and second curved elastic arms being held at fixed positions and an external force urging the slider button in a direction opposite to the third direction, the locking part moves in the direction opposite to the third direction, and the urging of the slider button distorts the first and second curved elastic arms such that upon removal of the external force, the first and second curved elastic arms move the slider button and the locking part in the third direction, and
the first and second curved elastic arms, the slider button, and the locking part form a single piece of elastic material.

10. The integrated latching mechanism of claim 9, wherein the first and second curved elastic arms are each substantially U-shaped.

11. The integrated latching mechanism of claim 10, wherein at a base of the U-shape, each of the first and second curved elastic arms includes a portion configured to press against wall portions of a unit in which the integrated latching mechanism is held.

12. The integrated latching mechanism of claim 9, wherein the ends of the first and second curved elastic arms each include a pad having a post that extends away from the pad.

13. The integrated latching mechanism of claim 9, wherein the locking part includes a flat surface that is parallel to the third direction, and an opposing surface that slants toward and intersects with the flat surface at one end.

14. A fliptop unit, comprising:
a movable lid;
a bezel configured to surround the movable lid
an insert configured to be coupled with the bezel; and
an integrated latching mechanism that is disposed between the bezel and the insert, and comprising:
a slider button extending along a first direction through an aperture formed in the bezel,
first and second curved elastic arms that are each substantially U-shaped and which extend from the slider button in a second direction and then curve back in a direction opposite to the second direction, and at a base of the U-shape, each of the first and second curved elastic arms includes a portion configured to press against wall portions formed in a region of the bezel and hold the integrated latching mechanism in place, the ends of the first and second curved elastic arms each including a pad having a post that extends away from the pad and to couple with corresponding openings formed in the insert,
a locking part contiguous with the slider button and extending away from the slider button and the first and second curved elastic arms in a third direction perpendicular to the first direction, the locking part including a flat surface that is parallel to the third direction, and an opposing surface that slants toward and intersects with the flat surface at one end,
wherein in response to an external force urging the slider button in a direction opposite to the third direction, the locking part moves in the direction opposite to the third direction and releases the movable lid, and the urging of the slider button distorts the first and second curved elastic arms such that upon removal of the external force, the first and second curved elastic arms move the slider button and the locking part in the third direction, and
the first and second curved elastic arms, the slider button, and the locking part form a single piece of elastic material.

* * * * *